United States Patent
Cho et al.

(10) Patent No.: US 8,582,524 B2
(45) Date of Patent: Nov. 12, 2013

(54) METHOD FOR PERFORMING A BANDWIDTH REQUEST PROCEDURE, AND TERMINAL APPARATUS FOR SAME

(75) Inventors: Hee Jeong Cho, Anyang-si (KR); Young Soo Yuk, Anyang-si (KR); Ki Seon Ryu, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 13/321,344

(22) PCT Filed: May 25, 2010

(86) PCT No.: PCT/KR2010/003286
§ 371 (c)(1),
(2), (4) Date: Nov. 18, 2011

(87) PCT Pub. No.: WO2010/137844
PCT Pub. Date: Dec. 2, 2010

(65) Prior Publication Data
US 2012/0069813 A1    Mar. 22, 2012

Related U.S. Application Data

(60) Provisional application No. 61/221,089, filed on Jun. 29, 2009, provisional application No. 61/244,065, filed on Sep. 20, 2009, provisional application No. 61/180,924, filed on May 25, 2009.

(30) Foreign Application Priority Data

May 25, 2010    (KR) ......................... 10-2010-0048358

(51) Int. Cl.
*H04W 74/08*    (2009.01)
*H04W 72/04*    (2009.01)
*H04M 13/00*    (2006.01)

(52) U.S. Cl.
USPC ........... 370/329; 370/328; 370/331; 455/450; 455/452.2; 714/4.1; 714/E11.032

(58) Field of Classification Search
USPC ................ 370/254, 328, 329, 331, 386, 422; 455/436, 450, 452.2, 509, 451, 452.1; 714/4.1, 758, 807, E11.032
See application file for complete search history.

(56) References Cited

U.S. PATENT DOCUMENTS 7,746,897 B2 *  6/2010  Stephenson et al. .......... 370/468
8,055,268 B2 * 11/2011  Lee et al. .................... 455/452.2
(Continued)

FOREIGN PATENT DOCUMENTS

KR    10-2006-0110950 A    10/2006
KR    10-2007-0036004 A    4/2007
(Continued)

OTHER PUBLICATIONS

International Search Report from PCT/KR2010/003286 mailed Dec. 31, 2010.

*Primary Examiner* — Afsar M Qureshi
(74) *Attorney, Agent, or Firm* — Morgan, Lewis & Bockius LLP

(57) ABSTRACT

The present document describes a method in which a terminal performs a bandwidth request procedure when a single terminal makes a bandwidth request for a plurality of flows. The present document also describes an improved bandwidth request header. When the terminal is allocated with an uplink resource for the transmission of a bandwidth request header from a base station during the bandwidth request procedure, the terminal may notify the base station, using a bandwidth request header indicating a bandwidth size of zero, that it has no data for which a bandwidth request is to be made to the base station, if the terminal has no data for which a bandwidth request is to be made to the base station.

14 Claims, 13 Drawing Sheets

(56) References Cited

U.S. PATENT DOCUMENTS

| | | | |
|---|---|---|---|
| 2005/0064818 A1* | 3/2005 | Assarsson et al. | 455/41.2 |
| 2006/0239241 A1* | 10/2006 | Eom et al. | 370/348 |
| 2007/0104177 A1* | 5/2007 | Hwang et al. | 370/348 |
| 2007/0293231 A1* | 12/2007 | So | 455/450 |
| 2008/0139216 A1* | 6/2008 | Lee et al. | 455/452.2 |
| 2008/0232330 A1 | 9/2008 | Lee et al. | |
| 2009/0109932 A1* | 4/2009 | Maheshwari et al. | 370/335 |
| 2009/0323602 A1* | 12/2009 | Li et al. | 370/329 |
| 2010/0103885 A1* | 4/2010 | Cordeiro et al. | 370/329 |
| 2012/0063409 A1* | 3/2012 | Novak et al. | 370/330 |

FOREIGN PATENT DOCUMENTS

| | | |
|---|---|---|
| KR | 10-2008-0051998 A | 6/2008 |
| KR | 10-2009-0038990 A | 4/2009 |

* cited by examiner

METHOD FOR PERFORMING A BANDWIDTH REQUEST PROCEDURE, AND TERMINAL APPARATUS FOR SAME

This is a U.S. National Phase Entry of PCT Application No. PCT/KR2010/003286, filed May 25, 2010, and claims the benefit of U.S. Provisional Application No. 61/244,065 filed Sep. 20, 2009; 61/221,089 filed Jun. 29, 2009; and 61/180,924 filed May 25, 2009. The present national stage application also claims the benefit of Korean Patent Application No. 10-2010-0048358, filed May 25, 2010.

TECHNICAL FIELD

The present invention relates to a method for a mobile station to perform a bandwidth request operation and an advanced bandwidth request header in the case in which the mobile station issues a bandwidth request for a plurality of flows.

BACKGROUND ART

In an Institute of Electrical and Electronics Engineers (IEEE) 802.16e system, a Base Station (BS) allocates resources to a Mobile Station (MS) that has requested a bandwidth using a ranging code through a Code Division Multiple Access (CDMA) allocation Information Element (IE).

Ranging codes are classified into four types according to purpose, i.e., a ranging code for initial ranging, a ranging code for handover ranging, a ranging code for periodic ranging, and a ranging code for bandwidth request. Conventionally, a plurality of ranging codes is generated and classified into four types according to purpose. Thus, the ranging codes have different indexes.

Table 1 illustrates a CDMA allocation IE.

TABLE 1

| Syntax | Size (bit) | Notes |
|---|---|---|
| CDMA_Allocation_IE( ) { | — | — |
| Duration | 6 | — |
| UIUC | 4 | UIUC for transmission |
| Repetition Coding Indication | 2 | 0b00: No repetition coding<br>0b01: Repetition coding of 2 used<br>0b10: Repetition coding of 4 used<br>0b11: Repetition coding of 6 used |
| Frame Number Index | 4 | LSBs of relevant frame number |
| Ranging Code | 8 | — |
| Ranging Symbol | 8 | — |
| Ranging subchannel | 7 | — |
| BW request mandatory | 1 | 1: Yes<br>0: No |
| } | — | — |

In Table 1, a duration field indicates the amount of resources, which a BS allocates to an MS by the CDMA allocation IE, in Orthogonal Frequency Division Multiple Access (OFDMA) symbols. A repetition coding indication field indicates a coding rate of data that the MS is to transmit through the allocated resources.

A frame number index indicates a frame in which the MS has transmitted a CDMA code and four Least Significant Bits (LSBs) of a frame number are used as the frame number index.

A ranging code field indicates a CDMA code transmitted by the MS, a ranging symbol field indicates an OFMA symbol through which the MS has transmitted the CDMA code, and a ranging subchannel field indicates a ranging subchannel through which the MS has transmitted the CDMA code.

FIG. 1 illustrates an initial ranging/handover ranging procedure among competition-based random access ranging procedures.

An advanced mobile station (AMS) may transmit a ranging preamble sequence (ranging code) for initial/handover ranging to an advanced base station (ABS) (S101). The ABS may transmit a reception state and a physical layer (PHY) adjustment value (for example, timing, power, frequency, etc) of a ranging code transmitted by each AMS to the AMS through an AAI_RNG-ACK message (S102). When the ABS has normally received a ranging code, the ABS may allocate uplink resources to the AMS through a CDMA allocation A-MAP IE. The AMS may transmit an RNG-REQ message through the allocated resource region (S103). The ABS may transmit an RNG-RSP message to the AMS in response to the RNG-REQ message (S104).

FIG. 2 illustrates a periodic ranging procedure among competition-based random access ranging procedures.

The AMS may transmit a ranging code for periodic ranging to the ABS (S201). The ABS may transmit a reception state and a physical layer adjustment value (for example, timing, power, frequency, etc.) of a ranging code transmitted by each AMS to the AMS through an AAI_RNG-ACK message (S202).

The AMS may perform a bandwidth request ranging procedure for uplink data transmission to the ABS. The bandwidth request procedure may be mainly divided into a 3-step procedure and a 5-step procedure. The bandwidth request may also be simply referred to as a BR.

FIG. 3 illustrates a competition-based 3-step random access uplink bandwidth request procedure.

The AMS may transmit a quick access message including a BR preamble sequence (BR code) and uplink bandwidth request information (for example, a station ID, a BR index indicating a requested bandwidth size, etc.) to the ABS (1). The ABS may transmit reception states of a quick access message and a BR code transmitted by each AMS to the AMS through a BR ACK A-MAP IE (2). When the ABS has normally received the BR code and the quick access message, the ABS may allocate grant information for allocating UL resources to the AMS through a UL basic assignment A-MAP IE (2). This allows the AMS to transmit UL data through the allocated resource region (3).

FIG. 4 illustrates a competition-based 5-step random access uplink bandwidth request procedure. The 5-step bandwidth request (BR) procedure may be mainly divided into a fallback mode and a normal mode.

First, the 5-step BR procedure is described below assuming the fallback mode.

An AMS may transmit a quick access message including uplink bandwidth request information (a station ID, a BR index indicating the size of a requested bandwidth, etc.) to the ABS (1). The fallback mode corresponds to the case in which the ABS has received only the BR code among the BR code and the quick access message transmitted by the AMS, i.e., in which the ABS has not received the quick access message.

The ABS may transmit the reception states of a BR code and a quick access message transmitted by each AMS to the AMS through a BR ACK A-MAP IE (2). When the ABS has normally received only the BR code transmitted by the AMS, the ABS may allocate uplink resources, which allow the AMS to transmit a BW-REQ message (a BR header), to the AMS through a CDMA allocation A-MAP (2).

The AMS may transmit a BW-REQ message (in the form of a header) to the ABS through the allocated resource region (3). When the ABS has received the BW-REQ message transmitted by the AMS, the ABS may allocate uplink resources to the AMS through a UL basic assignment A-MAP IE (4). The AMS may transmit data to the ABS through the allocated uplink resource region (5).

An overall procedure of the general 5-step BR procedure is similar to the fallback mode with the only difference being that the AMS does not transmit a quick access message at the first step.

In the procedure described above with reference to FIGS. 3 and 4, the AMS may start a BR timer after transmitting a BR code and may transmit data through an allocated resource region upon receiving an uplink grant from the ABS and then may terminate the BR timer. The AMS may request uplink resources from the ABS if an uplink grant is not received from the ABS before the timer expires.

When the ABS has received only the BR code, the ABS allocates uplink resources for BR header transmission to the AMS through a CDMA allocation IE and, when the ABS has also received a BR header or a quick access message, the ABS may allocate uplink resources to the AMS in a unicast manner through a station ID (STID).

In the IEEE 802.16e system, a bandwidth request message is transmitted through a signaling header which has a format described below.

FIG. 5 illustrates a signaling header format used in the IEEE 802.16e system.

In the case in which a Medium Access Control (MAC) header format as shown in FIG. 5 is used in the IEEE 802.16e system, payload is not transmitted subsequent to the MAC header. A type field in the signaling header shown in FIG. 5 may be 3 bits long and may indicate 8 types as illustrated in the following Table 2.

TABLE 2

| Type field (3 bits) | MAC header type (with HT/EC = 0b10) |
|---|---|
| 000 | BR incremental |
| 001 | BR aggregate |
| 010 | PHY channel report |
| 011 | BR with UL Tx power report |
| 100 | BR and CINR report |
| 101 | BR with UL sleep control |
| 110 | SN Report |
| 111 | CQICH allocation request |

As shown in Table 2, a BR-REQ message may be transmitted alone and may also be transmitted together with Tx power, CINR, or UL sleep control information.

FIGS. 6 and 7 illustrate a BR signaling header format used in the IEEE 802.16e system.

In FIGS. 6 and 7, a BR field indicates the size of an uplink bandwidth required by an AMS in bytes. The BR may be performed regardless of physical layer modulation and coding. The BR corresponds to each respective Connection ID (CID). Through the BR, it is possible to request a size of 0 to 524,287 bytes when the length of the BR field is 19 bits and to request a size of 0 to 2,047 bytes when the length of the BR field is 11 bits.

In FIGS. 6 and 7, the CID field includes a connection identification having a length of 16 bits indicating which service flow of which AMS corresponds to the header.

DISCLOSURE

Technical Problem

In the IEEE 802.16m system which is an advanced version of the IEEE 802.16e system, a 16-bit CID is used as two different IDs, a Station ID (STID) that identifies a mobile station and a Flow ID (FID) that indicates a service flow of the mobile station, and therefore there is a need to define an advanced BR header format in the IEEE 802.16m system.

In addition, there is a need to study how to efficiently operate a mobile station when an independent BR procedure is performed for each flow of the mobile station.

Technical Solution

In one aspect of the present invention, the object of the present invention can be achieved by providing a method for a mobile station to perform a bandwidth request operation, the method including transmitting a first bandwidth request (BR) code for a first service flow of the mobile station to a base station, transmitting a second BR code for a second service flow of the mobile station to the base station, receiving first uplink resource allocation information in response to one of the first BR code and the second BR code from the base station, transmitting a first BR header corresponding to the first service flow and a second BR header corresponding to the second service flow through an uplink resource corresponding to the first uplink resource allocation information, and transmitting a specific BR header, in which a requested bandwidth size is set to 0, to the base station upon receiving second uplink resource allocation information in response to the other of the first BR code and the second BR code from the base station.

Here, the method may further include starting a first BR timer corresponding to the first service flow and a second BR timer corresponding to the second service flow after transmitting the first BR code and the second BR code.

The method may further include comparing a size of a specific uplink resource corresponding to uplink resource allocation information for data transmission received from the base station with a size of first data to be transmitted using the first service flow and second data to be transmitted using the second service flow upon receiving the uplink resource allocation information for data transmission from the base station after transmitting the first BR header and the second BR header, wherein the first BR timer and the second BR timer are selectively terminated according to a result of the comparison.

The method may further include terminating both the first BR timer and the second BR timer upon determining, from the result of the comparison, that the size of the specific uplink resource is a size allocated taking into consideration both the first BR header and the second BR header.

The method may further include selectively terminating one of the first BR timer and the second BR timer upon determining, from the result of the comparison, that the size of the specific uplink resource is a size allocated taking into consideration a BR header, corresponding to the one of the first BR timer and the second BR timer, from among the first BR header and the second BR header.

When bandwidth request information for a specific service flow has changed before the mobile station transmits a BR header after transmitting a BR code for the specific service flow, the mobile station may transmit the BR header including the changed bandwidth request information.

When bandwidth request information for a specific service flow has changed after the mobile station transmits a BR header for the specific service flow, the mobile station may transmit the changed bandwidth request information through an uplink resource corresponding to uplink resource allocation information corresponding to the BR header.

Each of the first BR header and the second BR header may include a first field indicating whether or not a corresponding header is a Medium Access Control (MAC) signaling header, a second field indicating a MAC signaling header type, a third field that is a content field including content of the header, and a fourth field that is a CRC field. Here, the third field may include a Flow ID (FID) indicating a service flow which is associated with the BR header, a Station ID (STID) indicating a mobile station which transmits the BR header, a BR size field indicating a requested bandwidth size, and a BR type field indicating whether a corresponding bandwidth request corresponds to an increment of a previous bandwidth request or an entire requested bandwidth. Preferably, the BR size field may have a size in units of bits. In addition, the third field may further include an STID flag field indicating whether or not the STID field is included in the BR header.

The fourth field may include a CRC having a length of 8 bits.

In another aspect of the present invention, the object of the present invention can be achieved by providing a mobile station for performing a bandwidth request operation for a base station, the mobile station including an antenna for receiving a signal from the base station and transmitting a signal to the base station, and a processor for processing a signal received through the antenna and a signal transmitted through the antenna, wherein the processor is configured to transmit bandwidth request (BR) codes for a plurality of service flows independently of each other and to transmit a specific BR header in which a requested bandwidth size is set to 0 when there is no BR header to be transmitted upon receiving an uplink resource for BR header transmission from the base station.

Here, the processor may be configured to start respective BR timers for the plurality of service flows after transmitting respective BR codes for the plurality of service flows.

In addition, upon receiving uplink resource allocation information for data transmission from the base station, the processor may selectively terminate the BR timers taking into consideration a size of data to be transmitted using each of the plurality of service flows.

Advantageous Effects

According to the embodiments of the present invention, in the case in which an independent BR procedure is performed for each flow of a specific mobile station, it is possible to smoothly perform the BR procedure even when the mobile station has no data to be transmitted upon receiving an allocation of resources for a specific service flow from a base station and it is also possible to efficiently transmit resource request change information to the base station.

In addition, it is possible to perform efficient communication using a BR header optimized for the IEEE 802.16m system.

BEST MODE

Embodiments of the present invention will now be described in detail with reference to the accompanying drawings so that those skilled in the art can easily practice the present invention. However, the present invention is not limited to the embodiments described below and can be implemented in various other forms. Portions which are not specifically related to the present invention will not be described in order to clearly explain the present invention and like reference numbers will be used throughout the drawings to refer to like parts.

The expression "a portion includes a specific component" used throughout this specification indicates that the portion may also include other components, rather than including the specific component alone, unless explicitly stated otherwise. The terms "unit", "er(or)" or "module" used in this specification refer to a unit performing at least one function or operation, which can be realized by hardware or software or by a combination of hardware and software.

First, a method for operating a mobile station according to an embodiment of the present invention is described below with reference to the case in which an independent BR procedure is performed for each flow of the mobile station.

In this embodiment, it is assumed that a mobile station does not redundantly perform random access request (BR code transmission) for a specific service flow until a BR timer of the service flow expires. However, it is assumed that the mobile station is set such that the mobile station is allowed to perform random access request (BR code transmission) for service flows other than a specific service flow while a BR timer of the specific service flow runs. That is, the mobile station may attempt to request an uplink bandwidth for a specific flow while a BR procedure of another flow is in progress. For example, the mobile station may perform a BR procedure for flow B even before a response to a BR for flow A is received. A method for operating a mobile station according to this embodiment is described below with reference to specific situations.

Figure 1:
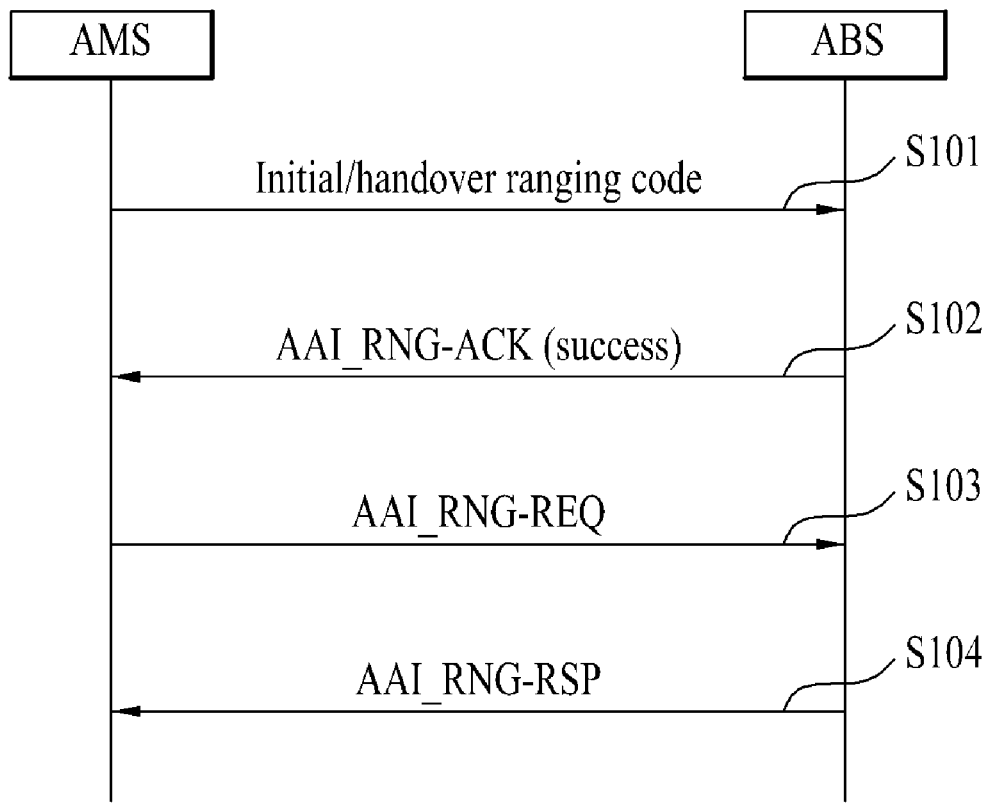
FIG. 1 illustrates an initial ranging/handover ranging procedure among competition-based random access ranging procedures.
Figure 2:
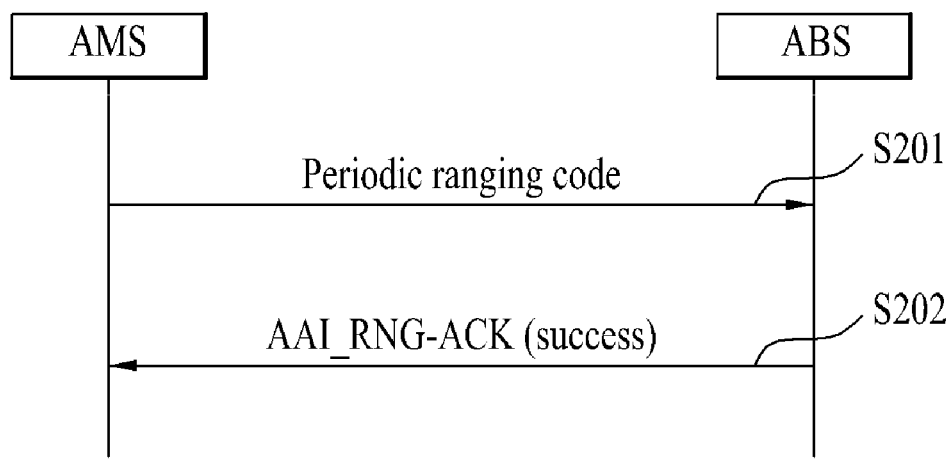
FIG. 2 illustrates a periodic ranging procedure among competition-based random access ranging procedures.
Figure 3:
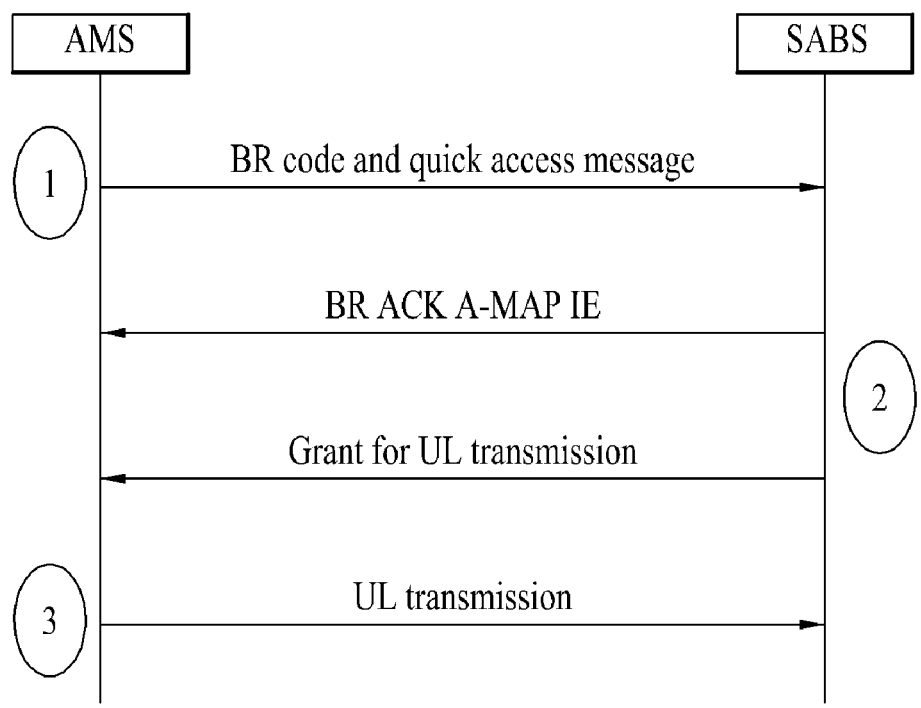
FIG. 3 illustrates a competition-based 3-step random access uplink bandwidth request procedure.
Figure 4:
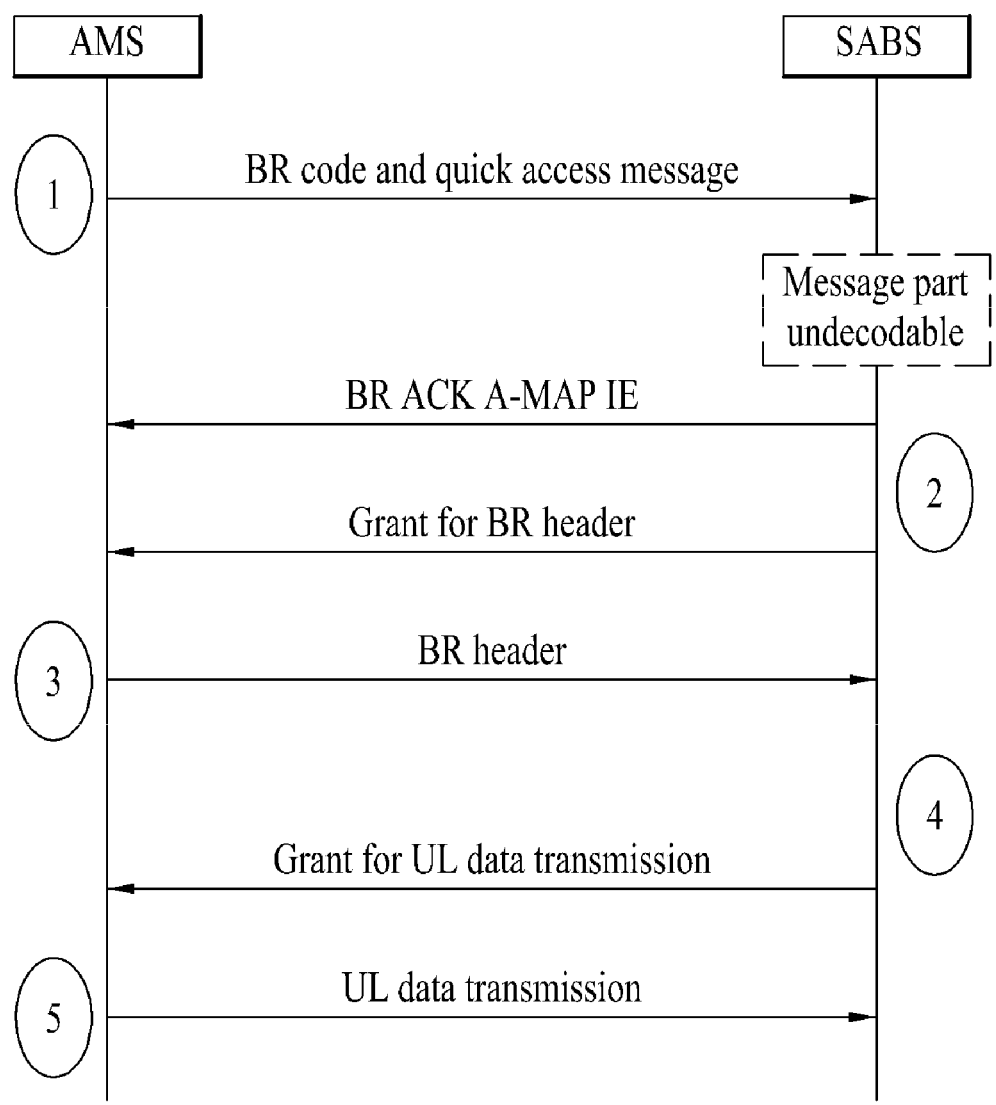
FIG. 4 illustrates a competition-based 5-step random access uplink bandwidth request procedure.
Figure 5:
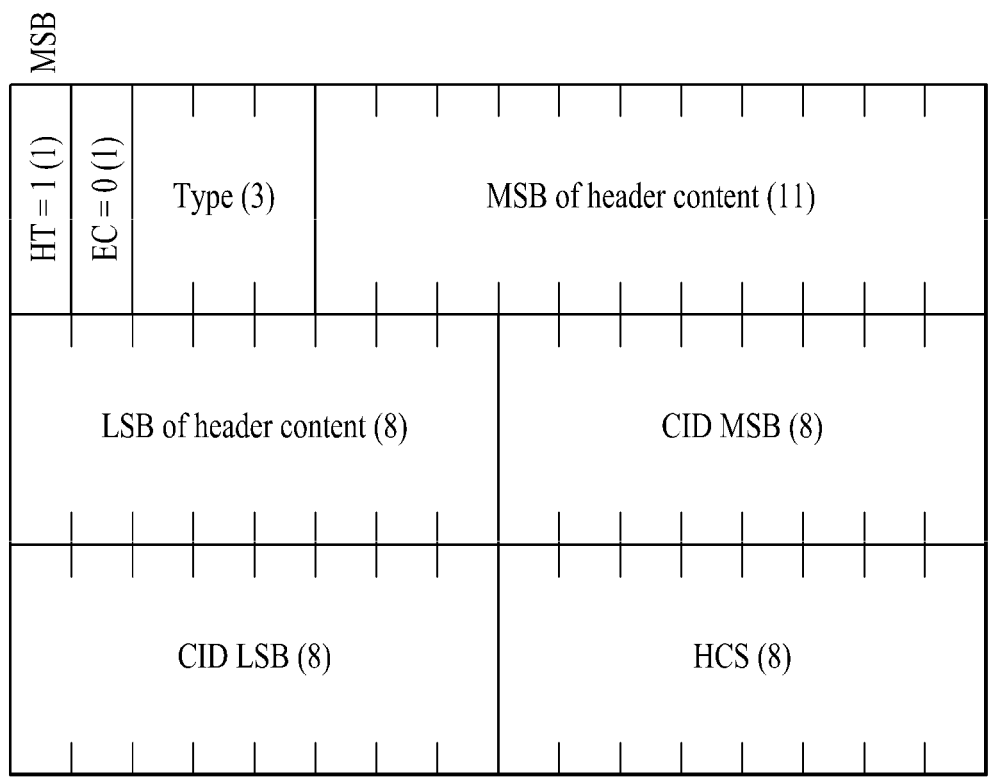
FIG. 5 illustrates a signaling header format used in the IEEE 802.16e system.
Figure 6:
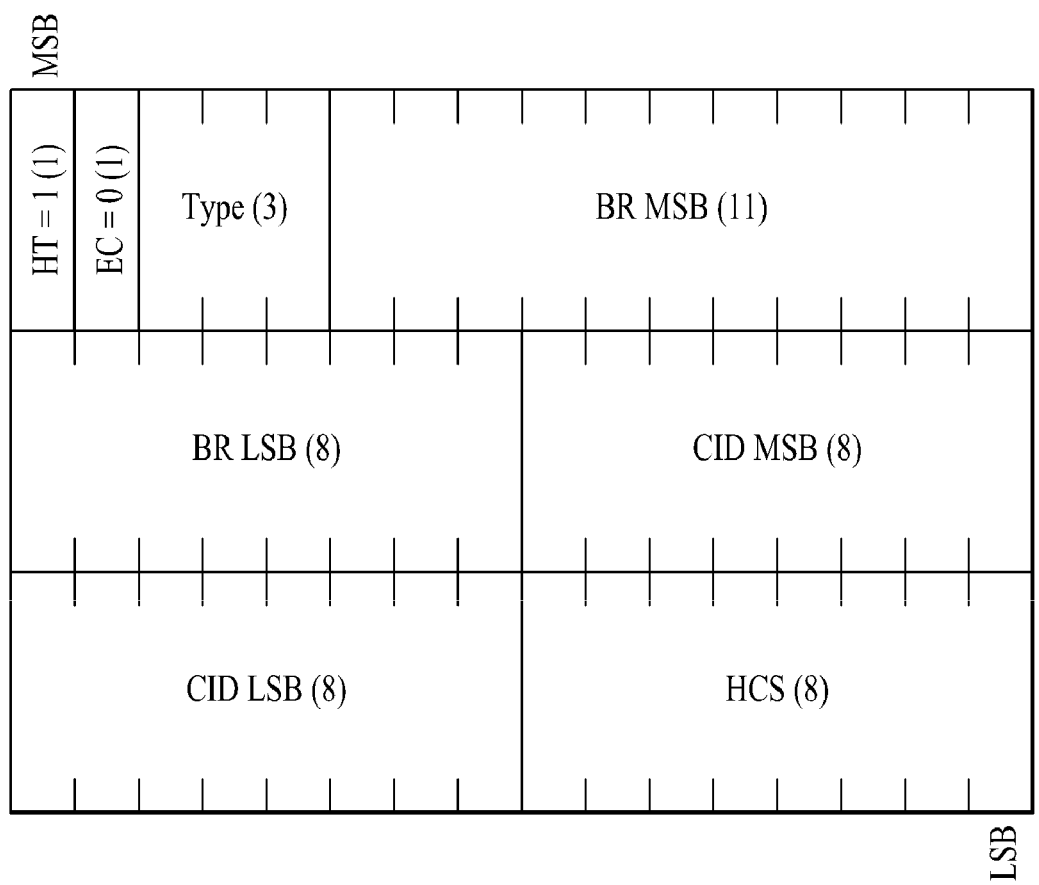
FIGS. 6 and 7 illustrate a BR signaling header format used in the IEEE 802.16e system.
Figure 7:
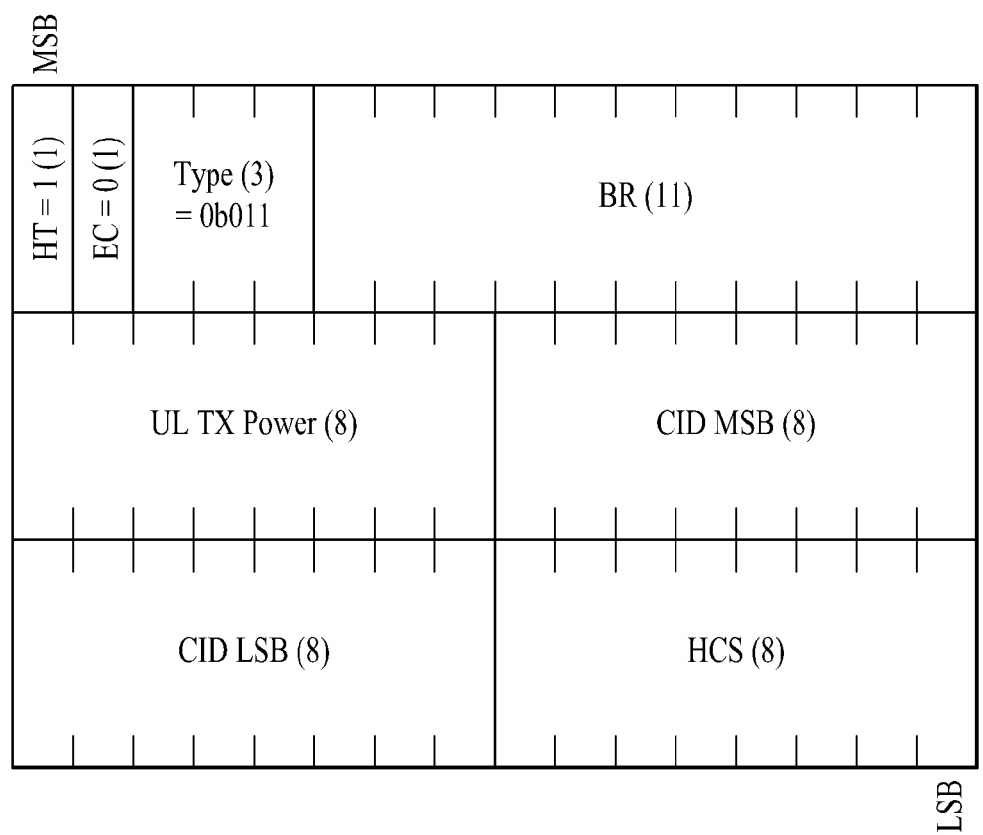
Figure 8:
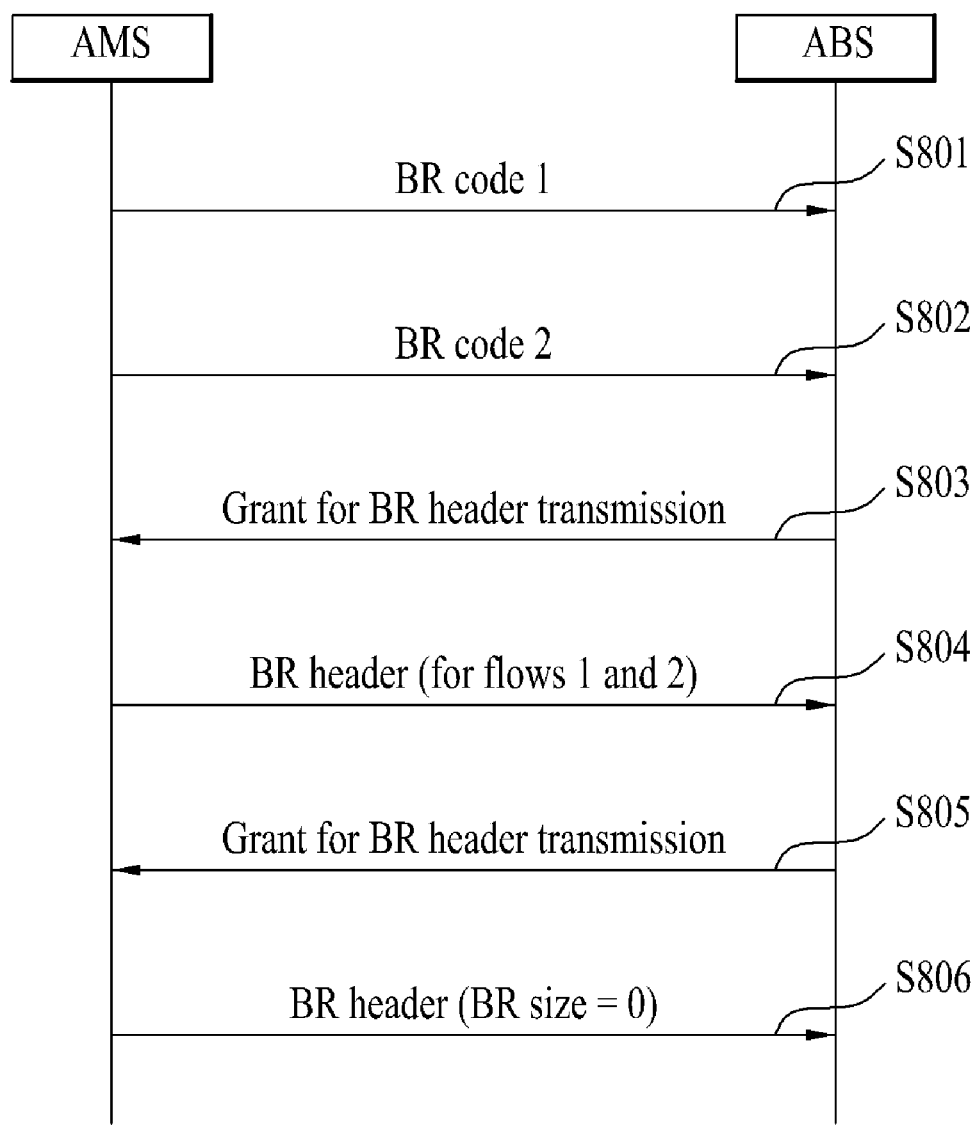
FIG. 8 illustrates a BR procedure for a mobile station according to an embodiment of the present invention.

FIG. 8 illustrates a BR procedure for a mobile station according to an embodiment of the present invention.

In this embodiment, it is assumed that an advanced mobile station (AMS) performs a 5-step BR procedure in the fallback mode or in the normal mode described above. Specifically, the AMS may transmit a BR code of service flow to an advanced base station (ABS) (S801) and may also transmit a BR code of service flow 2 to the ABS, independently of transmission of the BR code of service flow 1 (S802). Of course, this may be considered the same as the case in which the ABS receives only BR codes although the AMS has transmitted not only BR codes of the service flows 1 and 2 but also a quick access message.

When the ABS has received only BR codes as described above, the ABS transmits a CDMA allocation A-MAP IE for every detected BR code since it cannot determine which AMS has transmitted the BR codes. In the example of FIG. 8, the ABS first transmits a CDMA allocation A-MAP IE for BR header transmission in response to a first detected BR code 1 (S803).

When UL resources for BR header transmission have been allocated to the AMS, the AMS may transmit not only a BR header corresponding to the service flow 1 but also a BR header corresponding to the service flow 2 at the corresponding time (S804). Thereafter, it is assumed that the AMS has received a CDMA allocation A-MAP IE that the ABS has transmitted in response to the BR code 2 (S805). In this case, the AMS has no UL data (MAC PDU) to be additionally transmitted at the corresponding time. Therefore, this embodiment suggests that the AMS transmit a specific BR header in which a requested BR size is set to 0 (i.e., a specific BR header in which the size of data to be transmitted is set to 0) to the ABS (S806). When the ABS has received such a BR header, the ABS does not need to allocate UL resources in response to the BR header.

The embodiment illustrated in FIG. 8 has been described above with reference to an example in which a BR procedure for a plurality of service flows is performed and the AMS transmits a BR header through a CDMA allocation IE received in response to another BR code such that the AMS has no BR header to be transmitted through a specific CDMA allocation IE. However, the present invention is not necessarily limited to this example. Thus, this embodiment suggests that a BR header, in which a BR size (i.e., the size of data to be transmitted) is set to 0, be transmitted to the ABS as described above in various cases, for example, in the case in which the AMS has no UL data to be transmitted at the corresponding time although it has received a grant (i.e., a CDMA allocation A-MAP IE or a BR ACK A-MAP IE) through a request issued by the AMS. For example, a BR header in which a BR size is set to 0 may also be used in the case in which the AMS has no data to be transmitted in uplink at the time when the AMS receives a grant for a BR code after transmitting the BR code.

In this embodiment, the AMS may start and maintain the BR timer if it has determined (through a BR ACK A-MAP IE) that the ABS has implicitly or explicitly received only a BR code in a request transmitted by the AMS. The AMS stops the BR timer if it receives a grant corresponding to a corresponding request before the BR timer expires. The AMS may resume the bandwidth request when the BR timer expires.

Figure 9:
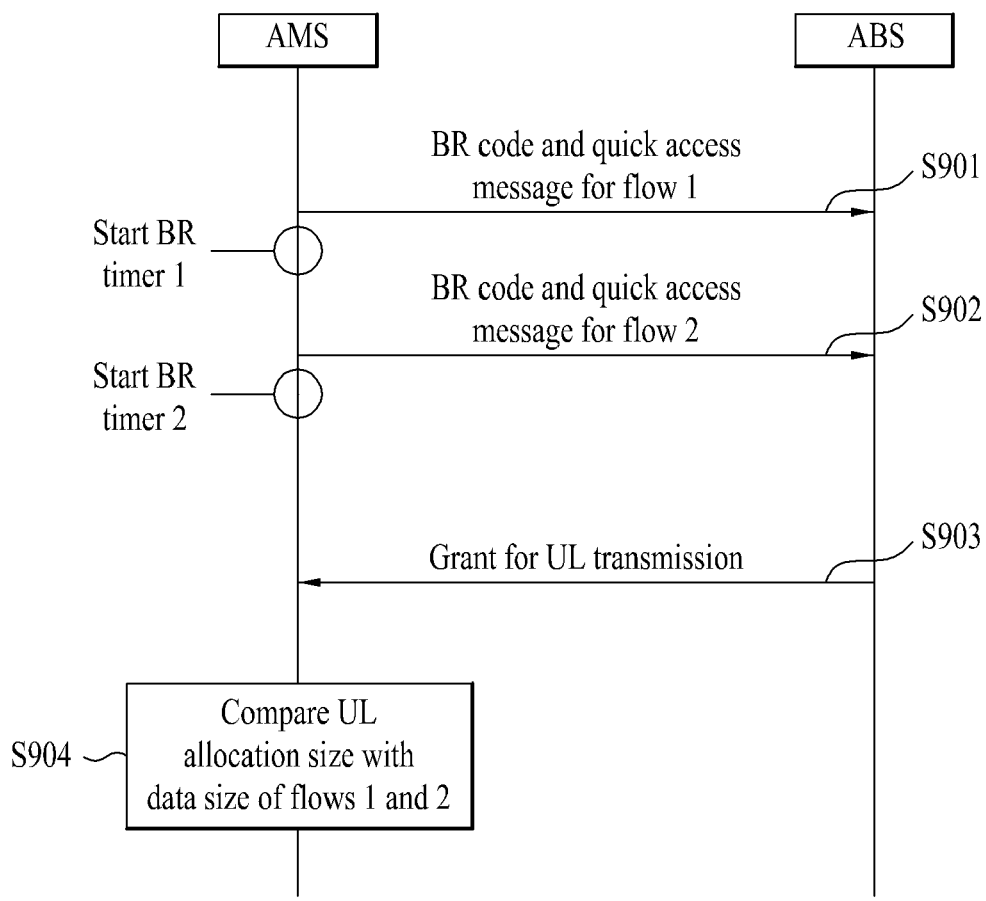
FIG. 9 illustrates a BR procedure for a mobile station according to another embodiment of the present invention.

FIG. 9 illustrates a BR procedure for a mobile station according to another embodiment of the present invention.

In this embodiment, the mobile station (AMS) transmits a BR code and a quick access message for a first service flow and initiates BR timer 1 (S901). Thereafter, the AMS may transmit a BR code and a quick access message for service flow 2, independently of the service flow 1, and then may initiate a BR timer 2 (S902). This embodiment suggests that, when the AMS has received a resource allocation (signal) for uplink data transmission from the ABS according to BR header transmission for two or more service flows (S903), the AMS compare the size of data to be transmitted for each service flow with the size of allocated uplink resources and selectively terminate the BR timer (S904). Although FIG. 9 illustrates the case in which the AMS receives a UL resource allocation (signal) for UL data transmission from the ABS using a 3-step BR procedure, the same method may be applied to the case in which the AMS receives a UL resource allocation signal for UL data transmission from the ABS after transmitting a BR header in a 5-step BR procedure.

In step S904, the AMS compares the size of data that can be transmitted through the resources allocated by the ABS with the sum of the sizes of all bandwidth requests (BRs) issued by the AMS. This embodiment suggests that, upon determining that the ABS has determined the size of the resources allocated to the AMS taking into consideration all BRs issued by the AMS, the AMS terminate all BR timers that have started by the BRs. For example, if the AMS receives a UL grant, which allows transmission of 54 bytes, from the ABS in response to requesting resources for transmission of 10, 20, and 30 bytes for 3 service flows, the AMS can determine that all requests issued by the AMS have been correctly received by the ABS. Accordingly, this embodiment suggests that the AMS terminate all BR timers for its requests although the received UL grant allows transmission of less than the requested amount.

This embodiment suggests that, if the AMS determines in step S904 that the ABS has determined the size of the resources allocated to the AMS taking into consideration only a specific BR rather than all BRs issued by the AMS, the AMS selectively terminate a BR timer started by the specific BR. For example, in this embodiment, if the AMS receives a UL grant, which allows transmission of 18 bytes, from the ABS after requesting 10 and 20 bytes respectively for 2 service flows, the AMS determines that only a bandwidth request for 20 bytes issued by the AMS has been correctly received by the ABS and selectively terminates a BR timer for the service flow for which 20 bytes have been requested.

The AMS may be configured such that the AMS terminates a BR timer which will expire first or last if the AMS cannot identify, from the determination of step S904, a BR which the ABS has received and taken into consideration for allocation. According to an embodiment of the present invention, the AMS may issue an additional bandwidth request using piggybacking when it has received an allocation of resources of an amount insufficient for the service flows.

The following is a description of an embodiment that is applied when a bandwidth request change for a specific service flow has occurred in the BR procedure.

Figure 10:
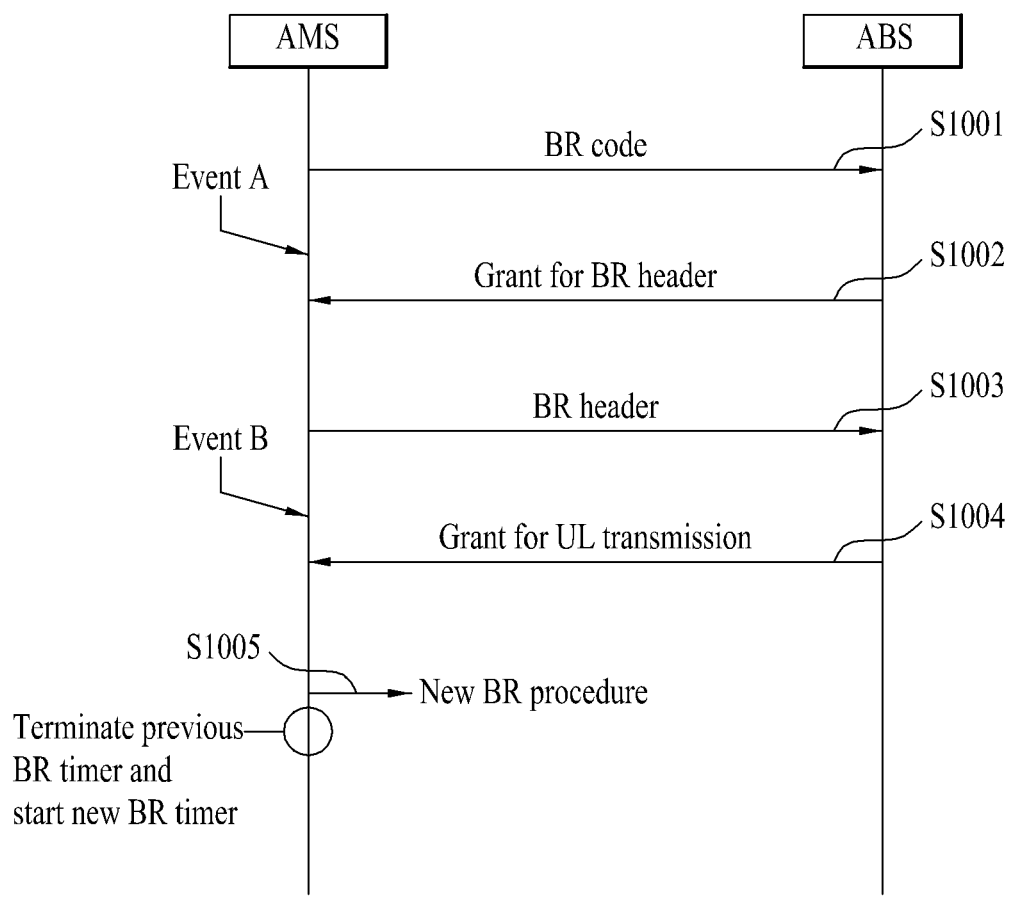
FIG. 10 illustrates a method for operating a mobile station when a bandwidth request change for a specific service flow has occurred during a BR procedure according to an embodiment of the present invention.

FIG. 10 illustrates a method for operating a mobile station when a bandwidth request change for a specific service flow has occurred during a BR procedure according to an embodiment of the present invention.

An AMS may transmit a BR code for a specific service flow to an ABS (S1001). This may be considered the same as the case in which the ABS receives only a BR code although the AMS has transmitted both the BR code and a quick access message. Thus, the ABS may transmit a CDMA allocation IE for BR header transmission to the AMS (S1002). This embodiment suggests that, when a request change for a corresponding service flow has occurred (i.e., event A has occurred) before the AMS transmits a BR header after transmitting a BR code in the case in which the ABS has received only the BR code, the AMS transmit the BR header taking into consideration changed information such as a changed size (S1003).

On the other hand, when a request change for the service flow has occurred (event B has occurred) after the AMS transmits the BR header, the AMS determines that a random access signal has been successfully received since the occurrence of the request change indicates that the AMS has received a CDMA allocation IE from the ABS as a response to the BR code (random access) transmitted by the AMS (satisfying constraint 1). Thereafter, the AMS may again request random access for transmitting the changed information to the ABS (S1005) or may additionally transmit the changed information through a resource region allocated by a UL grant that has been received from the ABS in response to the BR header in step S1004.

The AMS is set such that, in the case in which the AMS again requests random access, the AMS terminates a timer of a previously transmitted BR and uses only a timer of a BR that has been requested again. That is, it is assumed in this embodiment that only one timer is present for the same service flow.

However, if UL resources have been allocated before the AMS transmits the changed information and the changed information indicates that there is no need to issue a resource request through a previous BR header (for example, the changed information indicates a size of 0), the UL resource allocation may be used for other purposes or may be ignored.

In the case in which the ABS has received a random access re-request for the same service flow, the ABS may ignore a previous request that has not yet been processed and perform scheduling according to the re-request information.

The following is a description of a structure of a BR header that can be used in the BR procedure according to another aspect of the present invention.

In the IEEE 802.16m system which is an advanced version of the IEEE 802.16e system, a 16-bit CID is used as two different IDs, a Station ID (STID) that identifies a mobile station and a Flow ID (FID) that indicates a service flow of the mobile station, and therefore there is a need to define an advanced BR header format in the IEEE 802.16m system as described above. The IEEE 802.16m also has a different signaling header format from the legacy IEEE 802.16e system.

Figure 11:
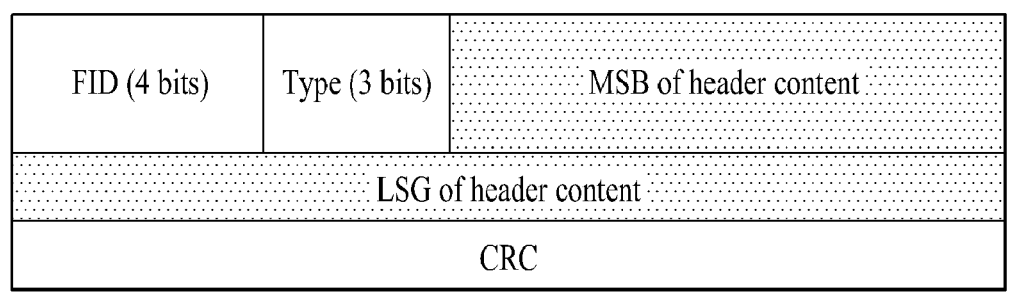
FIG. 11 schematically illustrates a signaling header format used in the IEEE 802.16m system.

FIG. 11 schematically illustrates a signaling header format used in the IEEE 802.16m system.

The following is a description of common fields of the signaling header illustrated in FIG. 11.

FID field: Indicates whether or not the header is a MAC signaling header.

Type field: Indicates the MAC signaling header type.

CRC field: includes a physical layer CRC.

BR content of a BR header according to an embodiment of the present invention is described below based on the above description.

This embodiment suggests that the BR content of the BR header include an FID field, an STID field, a BR size field, and a BR type field.

The FID field may indicate an FID for identifying a service flow whose BR header is requested. Preferably, the size of the field is 4 bits.

The STID field may indicate which AMS requests a UL bandwidth. Preferably, the size of the field is 12 bits.

The BR size field may indicate the size of the UL bandwidth that is requested by the AMS. In the IEEE 802.16m system, the size of burst data may be classified into 66 types as illustrated in the following Table 3.

TABLE 3

| idx | $N_{DB}$ (byte) | $K_{FB}$ |
|---|---|---|
| 1 | 6 | 1 |
| 2 | 8 | 1 |
| 3 | 9 | 1 |
| 4 | 10 | 1 |
| 5 | 11 | 1 |
| 6 | 12 | 1 |
| 7 | 13 | 1 |
| 8 | 15 | 1 |
| 9 | 17 | 1 |
| 10 | 19 | 1 |
| 11 | 22 | 1 |
| 12 | 25 | 1 |
| 13 | 27 | 1 |
| 14 | 31 | 1 |
| 15 | 36 | 1 |
| 16 | 40 | 1 |
| 17 | 44 | 1 |
| 18 | 50 | 1 |
| 19 | 57 | 1 |
| 20 | 64 | 1 |
| 21 | 71 | 1 |
| 22 | 80 | 1 |
| 23 | 90 | 1 |
| 24 | 100 | 1 |
| 25 | 114 | 1 |
| 26 | 128 | 1 |
| 27 | 144 | 1 |
| 28 | 164 | 1 |
| 29 | 180 | 1 |
| 30 | 204 | 1 |
| 31 | 232 | 1 |
| 32 | 264 | 1 |
| 33 | 296 | 1 |
| 34 | 328 | 1 |
| 35 | 368 | 1 |
| 36 | 416 | 1 |
| 37 | 472 | 1 |
| 38 | 528 | 1 |
| 39 | 600 | 1 |
| 40 | 656 | 2 |
| 41 | 736 | 2 |
| 42 | 832 | 2 |
| 43 | 944 | 2 |
| 44 | 1056 | 2 |
| 45 | 1200 | 2 |
| 46 | 1416 | 3 |
| 47 | 1584 | 3 |
| 48 | 1800 | 3 |
| 49 | 1888 | 4 |
| 50 | 2112 | 4 |
| 51 | 2400 | 4 |
| 52 | 2640 | 5 |
| 53 | 3000 | 5 |
| 54 | 3600 | 6 |
| 55 | 4200 | 7 |
| 56 | 4800 | 8 |
| 57 | 5400 | 9 |
| 58 | 6000 | 10 |
| 59 | 6600 | 11 |
| 60 | 7200 | 12 |
| 61 | 7800 | 13 |
| 62 | 8400 | 14 |
| 63 | 9600 | 16 |
| 64 | 10800 | 18 |
| 65 | 12000 | 20 |
| 66 | 14400 | 24 |

Accordingly, there is no need to define the size of the corresponding field in order to represent an entire range of requested size as in the conventional technology. That is, this embodiment suggests that the field be set to represent a burst size as shown in Table 3 without the need to represent the size in bytes. Preferably, the size of the field may have a size of 7 bits.

The BR type field may indicate whether the current BR request corresponds to an increment of a previous BR request or an entire requested bandwidth (i.e., whether the current BR request is incremental or aggregate). For example, the field may indicate that the BR request is "incremental" when the field is set to 0 and "aggregate" when the field is set to 1.

In addition, an embodiment of the present invention suggests that an STID flag field is additionally included as BR content. That is, the STID flag field may indicate whether or not an STID is included in the signaling header. For example, this field may indicate that no STID is transmitted within the signaling header when the field is set to 0 and that an STID is transmitted within the signaling header when the field is set to 1. This field may be omitted when a BR header including an STID and a BR header including no STID are discriminated by the signaling type of the header.

As described above, the BR header may be summarized as in the following Table 4.

TABLE 4

| Name | Length (bits) | Description |
| --- | --- | --- |
| FID | 4 | Flow identifier. This field indicates a MAC signaling header. |
| Type | 3 | MAC signaling header type. |
| BR type | 1 | Indicates whether the request is incremental or aggregate. 0: incremental, 1: aggregate |
| STID flag | 1 | Indicates whether STID is included. 0: not included, 1: included. |
| BR size | 7 | Index of burst size requested by AMS. The BR is associated with an FID. The request is independent of physical layer modulation and coding. |
| BR FID | 4 | FID corresponding to UL bandwidth request |
| STID | 12 | STID of AMS requesting UL bandwidth |
| CRC | — | Physical layer CRC |

Table 4 is an example in which only BR related information is included in the BR header. Table 4 may be rewritten as follows when not only BR related information but also UL transmission power (Tx power) are included in the BR header.

TABLE 5

| Name | Length (bits) | Description |
| --- | --- | --- |
| FID | 4 | Flow identifier. This field indicates a MAC signaling header. |
| Type | 3 | MAC signaling header type. |
| BR type | 1 | Indictes whether the request is incremental or aggregate. 0: incremental, 1: aggregate |
| BR size | 7 | Index of burst size requested by AMS. The BR is associated with an FID. The request is independent of physical layer modulation and coding. |
| UL transmission power | 8 | UL transmission power level in dBm for burst carrying the header. This value is measured and reported per burst. |

TABLE 5-continued

| Name | Length (bits) | Description |
| --- | --- | --- |
| BR FID | 4 | FID corresponding to UL bandwidth request |
| Reserved | 5 | |
| CRC | — | Physical layer CRC |

The following is a description of a physical CRC that is used in MAC PDU transmission according to another aspect of the present invention.

As described above, the ABS may deliver UL allocation resource information for transmitting a BW-REQ message (BR header) used for bandwidth request or an RNG-REQ message used for ranging to the AMS through a CDMA allocation A-MAP IE. In addition, a BR ACK A-MAP IE may be used to deliver UL allocation resource information for transmitting a BW-REQ message. Here, not much UL resources are required to transmit the BW-REQ message (BR header) since the amount of information in the message is small.

If the BW-REQ message (BR code) includes 48 bits of BR information, which are an amount of BR information required in the IEEE 802.16e system, and a 16-bit CRC which is a basic CRC in the IEEE 802.16m system, the ABS needs to allocate 3 Resource Units (RUs) of QPSK 1/8 (lowest MCS). In this case, the AMS transmits the message which includes 48-bit BR information, a 16-bit CRC, and 8 padding bits. This padding always causes a waste of 8 bits.

If the ABS allocates 2 RUs of QPSK 1/8 (lowest MCS), the AMS can transmit a message which includes 32-bit BR information and a 16-bit CRC. In this case, only 32 bits are used as BR information and 30% of the resources are used for error checking. That is, the 16-bit CRC may be unnecessarily large for the 32-bit information.

Accordingly, an embodiment of the present invention suggests that an 8-bit CRC be used for MAC PDU transmission in the case in which the ABS allocates a CDMA allocation A-MAP IE for a specific purpose. For example, the 8-bit CRC may be used in the case in which a CDMA allocation A-MAP IE for bandwidth request is received or in the case in which a BR ACK A-MAP IE is received and the 16-bit CRC may still be used in the other cases.

Figure 12:
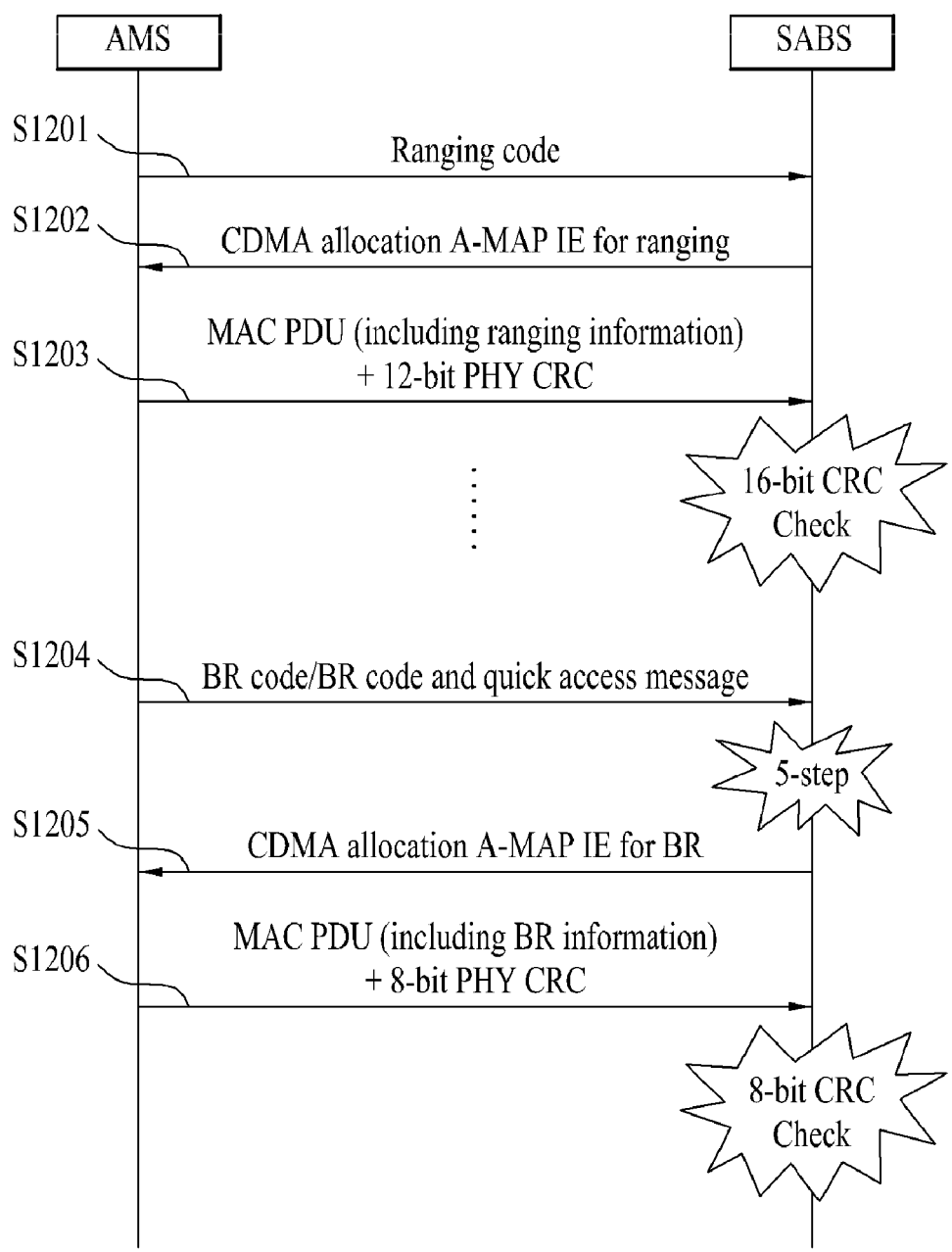
FIG. 12 illustrates a method for a mobile station to use an 8-bit CRC when a base station has allocated resources to the mobile station for a specific purpose according to an embodiment of the present invention.

FIG. 12 illustrates a method for a mobile station to use an 8-bit CRC when a base station has allocated resources to the mobile station for a specific purpose according to an embodiment of the present invention.

In FIG. 12, steps S1201 and S1203 correspond to a general ranging procedure. In this ranging procedure, an AMS uses a 16-bit CRC and an ABS receives a signal assuming that a 16-bit CRC has been used for the signal. In FIG. 12, steps S1204 to S1206 correspond to an exemplary 5-step BR procedure that the AMS performs for the ABS. The same method may be applied when the AMS performs a 3-step BR procedure. In this embodiment, the AMS may use an 8-bit CRC to transmit a MAC PDU to the ABS when performing a BR procedure and the ABS may receive the MAC PDU assuming that the AMS has transmitted the MAC PDU using an 8-bit CC.

That is, this embodiment suggests that the AMS use an 8-bit CRC rather than a 16-bit CRC when transmitting a MAC PDU (which includes payload or does not include payload) in a BR procedure. This embodiment also suggests that the AMS use an 8-bit CRC only upon receiving a BR related CDMA allocation A-MAP IE as described above, rather than using an 8-bit CRC upon receiving every CDMA allocation A-MAP IE.

Figure 13:
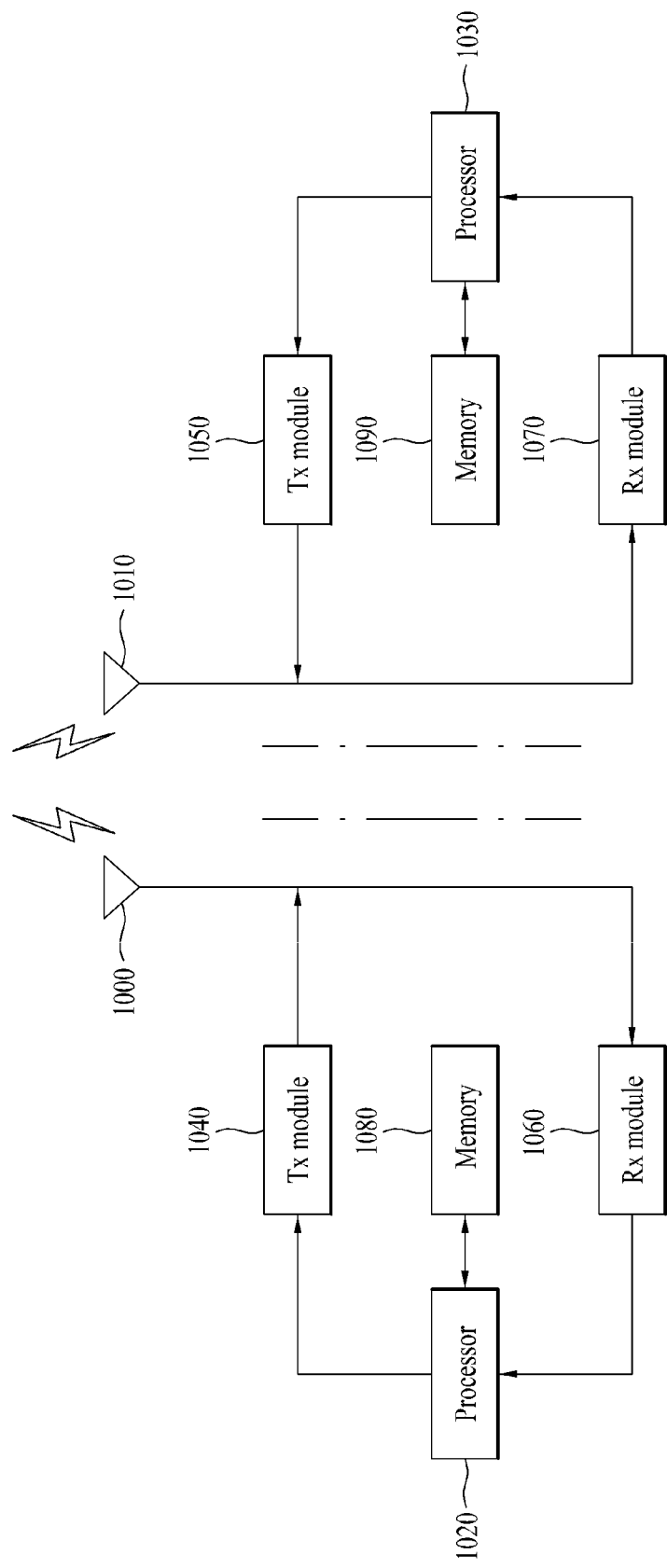
FIG. 13 is a block diagram of an AMS and an ABS for implementing the above embodiments of the present invention.

FIG. 13 is a block diagram of an AMS and an ABS for implementing the above embodiments of the present invention.

Referring to FIG. 13, the AMS and the ABS include antennas 1000 and 1010 for transmitting and receiving information, data, signals and/or messages, Transmission (Tx) modules 1040 and 1050 for transmitting messages by controlling the antennas 1000 and 1010, Reception (Rx) modules 1060 and 1070 for receiving messages by controlling the antennas 1000 and 1010, memories 1080 and 1090 for storing information related to communication with ABSs, and processors 1020 and 1030 for controlling the transmission modules 1040 and 1050, the reception modules 1060 and 1070, and the memories 1080 and 1090.

The antennas 1000 and 1010 transmit signals generated from the transmission modules 1040 and 1050 over the air, or output external radio signals to the reception modules 1060 and 1070. When Multiple Input Multiple Output (MIMO) is supported, two or more antennas may be used.

The processors 1020 and 1030 provide overall control to the AMS and the ABS. Especially, the processors 1020 and 1030 may perform a control function for implementing the embodiments of the present invention, for example, independent BR procedures for a plurality of service flows. Here, it is possible to use the BR header of the specific format described above. In addition, the processors 1020 and 1030 may perform a variable Media Access Control (MAC) frame control function based on service characteristics and a propagation environment, a handover function, and an authentication and encryption function. Also the processors 1020 and 1030 each may further include an encryption module for controlling encryption of various messages and a timer module for controlling transmission and reception of various messages.

The transmission modules 1040 and 1050 may process transmission signals and/or data scheduled by the processors 1020 and 1030 using a predetermined coding and modulation scheme and output the processed transmission signals and/or data to the antennas 1000 and 1010.

The reception modules 1060 and 1070 may restore original data by decoding and modulating radio signals received through the antennas 1000 and 1010 and thus may provide the original data to the processors 1020 and 1030.

The memories 1080 and 1090 may store programs for processing and control operations of the processors 1020 and 1030 and temporarily store input/output data. For example, the memory 1080 of the AMS may temporarily store a UL grant, system information, an STID, a Flow ID (FID), action time information, resource allocation information, and frame offset information, which are received from the ABS.

Each of the memories 1080 and 1090 may include at least one of a flash memory-type storage medium, a hard disc-type storage medium, a multimedia card micro-type storage medium, a card-type memory (e.g. a Secure Digital (SD) or extreme Digital (XD) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, and an optical disk.

The embodiments of the present invention may be achieved by various means, for example, hardware, firmware, software, or a combination thereof. In a hardware configuration, the methods for transmitting and receiving BR information in a wireless communication system according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for performing a BR procedure according to the embodiments of the present invention may be implemented in the form of a module, a procedure, a function, etc. performing the above-described functions or operations. Software code may be stored in a memory unit and executed by a processor. The memory unit may be located at the interior or exterior of the processor and may transmit and receive data to and from the processor via various known means.

INDUSTRIAL APPLICABILITY

Although the present invention has been described above mainly with reference to the case where the present invention is applied to IEEE 802.16 systems, the present invention may also be applied to various other wireless communication systems.

We claim:

1. A method for a mobile station to perform a bandwidth request operation, the method comprising:
transmitting a first bandwidth request (BR) code for a first service flow of the mobile station to a base station;
transmitting a second BR code for a second service flow of the mobile station to the base station;
receiving first uplink resource allocation information in response to one of the first BR code and the second BR code from the base station;
transmitting a first BR header corresponding to the first service flow and a second BR header corresponding to the second service flow through an uplink resource corresponding to the first uplink resource allocation information; and
transmitting a specific BR header, in which a requested bandwidth size is set to 0, to the base station upon receiving second uplink resource allocation information in response to the other of the first BR code and the second BR code from the base station.

2. The method according to claim 1, further comprising starting a first BR timer corresponding to the first service flow and a second BR timer corresponding to the second service flow after transmitting the first BR code and the second BR code.

3. The method according to claim 2, further comprising comparing a size of a specific uplink resource corresponding to uplink resource allocation information for data transmission received from the base station with a size of first data to be transmitted using the first service flow and second data to be transmitted using the second service flow upon receiving the uplink resource allocation information for data transmission from the base station after transmitting the first BR header and the second BR header,
wherein the first BR timer and the second BR timer are selectively terminated according to a result of the comparison.

4. The method according to claim 3, further comprising terminating both the first BR timer and the second BR timer upon determining, from the result of the comparison, that the size of the specific uplink resource is a size allocated taking into consideration both the first BR header and the second BR header.

5. The method according to claim 3, further comprising selectively terminating one of the first BR timer and the second BR timer upon determining, from the result of the comparison, that the size of the specific uplink resource is a size allocated taking into consideration a BR header, corresponding to the one of the first BR timer and the second BR timer, from among the first BR header and the second BR header.

6. The method according to claim 1, wherein, when bandwidth request information for a specific service flow has changed before the mobile station transmits a BR header after transmitting a BR code for the specific service flow, the mobile station transmits the BR header including the changed bandwidth request information.

7. The method according to claim 1, wherein, when bandwidth request information for a specific service flow has changed after the mobile station transmits a BR header for the specific service flow, the mobile station transmits the changed bandwidth request information through an uplink resource corresponding to uplink resource allocation information corresponding to the BR header.

8. The method according to claim 1, wherein each of the first BR header and the second BR header includes a first field indicating whether or not a corresponding header is a Medium Access Control (MAC) signaling header, a second field indicating a MAC signaling header type, a third field that is a content field including content of the header, and a fourth field that is a CRC field.

9. The method according to claim 8, wherein the third field includes a Flow ID (FID) indicating a service flow which is associated with the BR header, a Station ID (STID) indicating a mobile station which transmits the BR header, a BR size field indicating a requested bandwidth size, and a BR type field indicating whether a corresponding bandwidth request corresponds to an increment of a previous bandwidth request or an entire requested bandwidth, and
wherein the BR size field has a size in units of bits.

10. The method according to claim 9, wherein the third field further includes an STID flag field indicating whether or not the STID field is included in the BR header.

11. The method according to claim 8, wherein the fourth field includes a CRC having a length of 8 bits.

12. A mobile station for performing a bandwidth request operation for a base station, the mobile station comprising:
an antenna for receiving a signal from the base station and transmitting a signal to the base station; and
a processor for processing a signal received through the antenna and a signal transmitted through the antenna,
wherein the processor is configured to transmit bandwidth request (BR) codes for a plurality of service flows independently of each other and to transmit a specific BR header in which a requested bandwidth size is set to 0 when there is no BR header to be transmitted upon receiving an uplink resource for BR header transmission from the base station.

13. The mobile station according to claim 12, wherein the processor is configured to start respective BR timers for the plurality of service flows after transmitting respective BR codes for the plurality of service flows.

14. The mobile station according to claim 13, wherein, upon receiving uplink resource allocation information for data transmission from the base station, the processor selectively terminates the BR timers taking into consideration a size of data to be transmitted using each of the plurality of service flows.

* * * * *